United States Patent [19]
Iwata et al.

[11] Patent Number: 6,017,627
[45] Date of Patent: Jan. 25, 2000

[54] HIGH VOLTAGE ELECTRIC APPLIANCE

[75] Inventors: Noriyuki Iwata, Sagamihara; Kenji Sakayanagi, Tochigi, both of Japan

[73] Assignees: Kabushiki Kaisha Toshiba, Kawasaki; Nippon Rika Kogyosho Co., Ltd., Tokyo, both of Japan

[21] Appl. No.: 08/944,786

[22] Filed: Oct. 6, 1997

[30] Foreign Application Priority Data

Oct. 9, 1996 [JP] Japan .................................. 8-268155

[51] Int. Cl.⁷ .............................. H01B 3/04; H01B 3/18
[52] U.S. Cl. .................... 428/375; 428/324; 428/355 R; 428/921; 174/102 C; 174/102 P; 174/118; 174/121 R
[58] Field of Search .................... 428/324, 375, 428/355 R, 921; 174/102 C, 102 P, 118, 121 R

[56] References Cited

U.S. PATENT DOCUMENTS

| | | | |
|---|---|---|---|
| 3,655,565 | 4/1972 | McDonald | 252/63.2 |
| 4,060,451 | 11/1977 | Uchiyama et al. | 162/157 R |
| 4,259,398 | 3/1981 | Seino et al. | 428/283 |
| 4,273,825 | 6/1981 | Nishiyama et al. | 428/223 |
| 4,280,225 | 7/1981 | Willis | 455/55 |
| 5,079,077 | 1/1992 | Sakayanagi et al. | 428/237 |
| 5,393,872 | 2/1995 | Shinoki et al. | 528/310 |

FOREIGN PATENT DOCUMENTS

| | | |
|---|---|---|
| 0 049 128 | 4/1982 | European Pat. Off. . |
| 0 059 866 | 9/1982 | European Pat. Off. . |
| 0660336 | 6/1995 | European Pat. Off. . |
| 62-45687 | 9/1987 | Japan . |
| 1-47002 | 10/1989 | Japan . |

*Primary Examiner*—Deborah Jones
*Assistant Examiner*—Cathy F. Lam
*Attorney, Agent, or Firm*—Oblon, Spivak, McClelland, Maier & Neustadt, P.C.

[57] ABSTRACT

Disclosed is a high voltage electric appliance comprising electric coils whose conductors are wrapped by an insulating tape with subsequent impregnation of thermosetting resin for the electrical insulation. The insulating tape is a laminated body consisting of a built-up mica of fine mica particles and synthetic pulp or a paraffin powder and a reinforcing member. The bonding among the fine mica particles and between the fine mica particles and the reinforcing material is effected by the synthetic pulp as melted and solidified.

6 Claims, 2 Drawing Sheets

HIGH VOLTAGE ELECTRIC APPLIANCE

BACKGROUND OF THE INVENTION

1. Field of the Invention

The present invention relates to a high voltage electric appliance, more specifically, to an improvement of an insulating tape used for the high voltage electric appliance including electric coils which are wrapped by the insulating tape with subsequent thermosetting resin impregnation for electrical insulation.

2. Discussion of the Background

Built-up mica tapes of various types are widely used for electrical insulation of electric coils incorporated in a high voltage electrical appliance, e.g., a high voltage rotary machine, in light of their excellent properties of electrical insulation and resistance to heat. Generally, these mica tapes comprise built-up mica which is made by a so-called four-drinier paper making machine from fine mica particles, and a reinforcing material, such as paper, a glass cloth or a polyester film, which is bonded to the built-up mica by an adhesive like a polyester resin, an epoxy resin or a silicone resin.

The fine mica particles forming the built-up mica are connected to each other by the water of crystallization contained in mica and the connection between the mica particles is frail. Due to such a frail connection, the built-up mica tends to peel off or tends to scatter, for example, in the process of wrapping the built-up mica tape around the electric coils for insulation. To overcome these problems, the amount of the adhesive is increased in an attempt to bond the mica particles. Alternatively, fibrids of aromatic polyamide are mixed with the mica particles in the paper making step so as to hold the mica particles with the fibrids in the built-up mica tape.

However, as the adhesive is increased in its amount, the mica content of the built-up mica tape is relatively decreased in the given thickness of the tape, which is undesirable in terms of the dielectric strength and heat resistance of the tape. Further, the increase of the adhesive content affects the resin impregnatability in the vacuum pressure impregnation treatment with a thermosetting resin for the wrapped electric coils of the high voltage rotary machine, for instance. In the case of admixture of aramide fibrids, the electric coils, when burnt for the purpose of reuse, generate harmful gases containing hydrogen cyanide, which has been an obstacle for such reuse of the electric coils or a bundle of conductors thereof.

BRIEF SUMMARY OF THE INVENTION

An object of the present invention is to provide a high voltage electric appliance which shows superior dielectric strength and heat resistance and is good in environmental aspect in an utilization of the insulation tapes which provide a good workability for wrapping the electric coils and the like and which provide superior resin impregnatability.

According to an aspect of the present invention, there is provided a high voltage electric appliance comprising a coil prepared by winding an insulating tape about a conductor, followed by impregnating the insulating tape with a thermosetting resin for the insulating purpose, wherein the insulating tape is in the form of a laminated body consisting of a built-up mica tape containing mica fine particles and a polyolefin-series synthetic pulp and reinforcements, the polyolefin-series synthetic pulp being melted and, then, solidified to achieve bonding among the mica fine particles and between the built-up mica tape and the reinforcing member.

According to another aspect of the present invention, there is provided a high voltage electric appliance comprising a coil prepared by winding an insulating tape about a conductor, followed by impregnating the insulating tape with a thermosetting resin for the insulating purpose, wherein the insulating tape is in the form of a laminated body consisting of a built-up mica tape containing mica fine particles and a paraffin powder and a reinforcing member, the paraffin powder being melted and, then, solidified to achieve bonding among the mica fine particles and between the built-up mica tape and the reinforcing member.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention, in which.

DETAILED DESCRIPTION OF THE INVENTION

Figure 1:
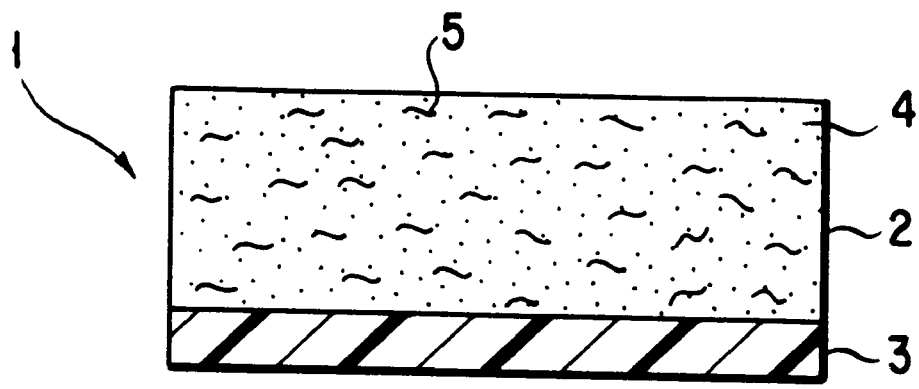
FIG. 1 is a cross sectional view schematically showing a built-up mica tape prepared in Example 1 of the present invention.

The present invention is directed to a high voltage electric appliance such as a high voltage rotary machine having electric coils which are insulated by an insulating tape with thermosetting resin impregnation. The insulating tape used in the electric appliance according to the present invention consists of a built-up mica made of fine mica particles, a polyolefin-series synthetic pulp or a paraffin powder and a reinforcing member.

Either natural mica or a synthetic mica can be used for making the insulating tape according to the present invention. For natural mica, there are available muscovite mica and phlogopite mica, and the muscovite mica can be used in its calcined or uncalcined type. The properties as to electric insulation and heat resistance of mica vary with its kind and type. Accordingly, in view of the required thermal, electrical and mechanical properties, appropriate mica is selected for use in the insulating tape.

The synthetic pulp used for the insulating tape according to the present invention is of polyolefin-series thermoplastic resin in the form of pulp-like multibranched fibers having a large surface area per unit volume or particles of irregular sizes made by mechanical or chemical treatments from polyethylene, polypropylene, polybutylene, polyisobutylene, etc. as a raw material. It is desirable in the present invention to use the synthetic pulp having Canadian standard freeness of 20 to 1,000 mL.

In the present invention, it is desirable that the synthetic pulp is contained in 2 to 12 parts by weight relative to mica of 100 parts by weight. If the mixing ratio of the synthetic pulp is less than 2 parts by weight, the synthetic pulp does not work sufficiently to hold fine mica particles. Further, the synthetic pulp, melted and solidified, does not provide sufficient adhesive strength to bind the fine mica particles as well as to bind the fine mica particles with the reinforcing material. As a result, these cause that the mica in the insulating tape tends to peel off or scatter. Over 12 parts by weight synthetic pulp renders the insulting tape less porous, and this decreases the impregnatability in the process of the vacuum pressure impregnation of thermosetting resin and entails a lowering of the electric insulating properties.

According to the present invention, a paraffin powder can be used in place of the above-mentioned polyolefin-series synthetic pulp. Desirablely, the paraffin powder used has a melting point of at least 75° C. and a particle size of 50 to 70 meshes.

The paraffin powder should be used in an amount of 5 to 30 parts by weight relative to 100 parts by weight of mica. If a mixing ratio of the paraffin powder, which is melted and, then, solidified, is less than 5 parts by weight, the synthetic paraffin powder fails to exhibit a sufficient bonding strength among the mica fine particles and between a built-up mica sheet and a reinforcing member which are laminated one upon the other to prepare the insulating tape used in the present invention. As a result, the mica sheet tends to peel off or the mica particles tend to be scattered. On the other hand, if the mixing ratio of the paraffin powder exceeds 30 parts by weight, the tape is rendered less porous. As a result, the tape fails to be impregnated sufficiently with a thermosetting resin in the process of the vacuum pressure impregnation of thermo-setting resin, leading to a low insulation capability.

As a reinforcing material, paper, plastic film, woven fabric (cloth), unwoven fabric and the like can be used in the insulating tape according to the present invention. The appropriate reinforcing material is determined in accordance with the required properties as to the mechanical strength, insulation and heat resistance. For example, the reinforcing material of organic woven or unwoven fabrics is desirable to enhance the adhesive strength of the polyolefin-series synthetic pulp. Further, where a higher level of heat resistance is required, it is desirable to use, as the reinforcing material, a polyimide film or the like which is superior in its heat resistance.

A built-up mica tape is used as an insulating tape in the present invention. The built-up mica tape is obtained from a master roll of the built-up mica laminated on the reinforcing material, by way of slitting the mater roll. It is noted therefore that a built-up mica sheet, 2 m or less in length, which is obtained from the master roll in the same manner, can also be applicable.

Hereinafter described is the method in which the built-up mica tape as used in the present invention is produced. First prepared is a slurry in admixture of the fine mica particles as pulverized and synthetic pulp or a paraffin powder. From this slurry, the built-up mica is made in the known manner by using the foudrinier paper making machine or cylinder paper making machine. Then, the built-up mica is laminated on a suitable reinforcing material and heated under a certain pressure. The heating under pressure as described above is effected, for example, by way of a hot calendar roll as generally used and, in this heating under pressure processing the synthetic pulp or paraffin powders contained in the built-up mica melt partly or entirely. As a result, the synthetic pulp or paraffin powders solidify and serve to bind the mica particles as well as to bond the mica particles and the reinforcing material.

Since the fine mica particles are strongly bonded to each other by the solidified synthetic pulp or paraffin powders, the mica content in the insulating tape can be increased. This means that the insulating tape according to the present invention can take an advantage of the intrinsic properties of mica and further that the peeling off or scattering of mica particles in the application for electric insulation purposes can be prevented. Thus, it makes it possible to provide a high voltage electric appliance which exhibits excellent properties in its dielectric strength and heat resistance. What should also be noted is that the synthetic pulp or paraffin powders used for the built-up mica tape according to the present invention do not contain nitrogen atoms, and it follows that the electric coils wrapped by the insulating tape can be reworked for reuse due to the fact that the above-mentioned synthetic pulp or paraffin powders, if burned, do not generate harmful gases such as hydrogen cyanide.

EXAMPLES

Example 1

Prepared was a slurry containing 100 parts by weight of a mica paper based on calcined muscovite and 3 parts by weight of polypropylene synthetic pulp having an average fiber length of 1.0 mm and a freeness of 700 mL. Then, a built-up mica sheet was prepared by a paper-making method using a known oblong mesh type paper-making machine. After dehydrated and dried, the built-up mica sheet was continuously laminated on one surface of a polyester film used as a reinforcing member, followed by passing under heat the laminated body through a calender roll so as to obtain a built-up mica tape.

FIG. 1 is a cross sectional view schematically showing the resultant built-up mica tape 1. As shown in FIG. 1, the built-up mica tape 1 was in the form of a laminated body consisting of a built-up mica sheet 2 and a polyester film 3 acting as a reinforcing member, said built-up mica sheet 2 consisting of mica fine particles 4 and a polypropylene synthetic pulp 5. During the calendering step, the synthetic pulp 5 was melted. When solidified later, the solidified synthetic pulp 5 strongly bonded the mica fine particles 4 to each other and also strongly bonded the built-up mica sheet 2 to the reinforcing member (polyester film 3).

Example 2

Prepared was a slurry containing 100 parts by weight of a hard non-burning type Muscovite mica and 15 parts by weight of a paraffin powder having an average particle size of 60 meshes. Then, a built-up mica sheet was prepared by a paper-making method using a known oblong mesh type paper-making machine. After dehydrated and dried, the built-up mica sheet was continuously laminated on one surface of a polyester film used as a reinforcing member, followed by passing under heat the laminated body through a calender roll so as to obtain a built-up mica tape.

Comparative Example:

A built-up mica sheet was prepared by a paper-making method using a slurry containing a hard non-burning type Muscovite mica and aramide fibrids. Then, the built-up mica sheet thus prepared was bonded to one surface of a polyester film with an adhesive containing an epoxy resin as a main component, so as to obtain a built-up mica tape.

Table 1 shows the properties of the built-up mica tape obtained in each of Examples 1, 2 and the Comparative Example.

TABLE 1

|  | Example 1 | Example 2 | Comparative Example |
| --- | --- | --- | --- |
| Thickness (mm) | 0.065 | 0.065 | 0.065 |
| Adhesive (g/m$^2$) | 0 | 0 | 6.6 |
| Mica (g/m$^2$) | 53 | 52 | 43 |
| Tensile strength (kg/cm) | 3.6 | 3.5 | 3.5 |
| Breakdown voltage (kV) | 6.9 | 6.9 | 6.3 |

The tensile strength and the breakdown voltage shown in Table 1 were measured by the method specified in JIS (Japanese Industrial Standards)-C2116.

As shown in Table 1, the average thickness of the built-up mica tape was 0.065 mm in each of Examples 1, 2 and the Comparative Example. Also, the mica amount per unit area is larger in each of Examples 1 and 2 than in Comparative Example because an adhesive such as an epoxy resin is not used in the Examples of the present invention. Further, the built-up mica tape in each of Examples 1 and 2 was found to be substantially equal in tensile strength and superior in breakdown voltage to the built-up mica tape in the Comparative Example.

Figure 2:
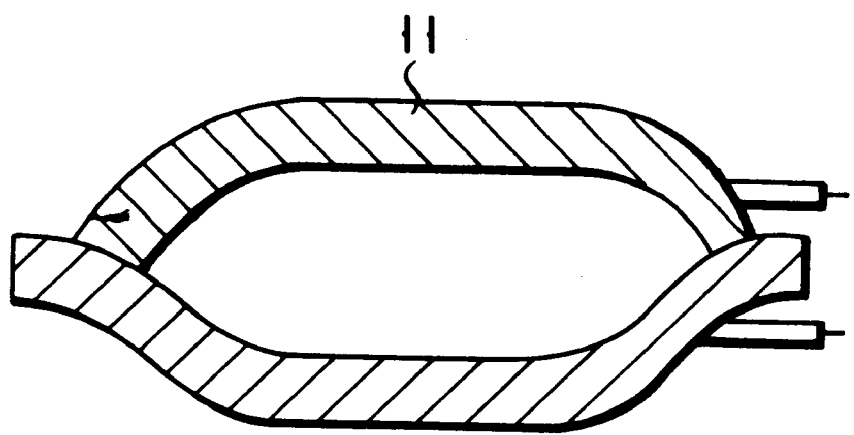
FIG. 2 is a cross sectional view schematically showing the construction of an insulated coil used in a high voltage electrical appliance of the present invention.

Each of the built-up mica tapes prepared in Examples 1, 2 and the Comparative Example was wound by an ordinary method about a conductor, followed by preparing a hexagonal insulated coil strand 11 as shown in FIG. 2 by using the insulated conductor. A plurality of hexagonal insulated coil strands 11 were laminated one upon the other, followed by winding a built-up mica tape about the resultant laminate structure. Further, the insulated laminate structure was subjected to an impregnation treatment under a combination of vacuum-pressurizing condition with a resin mixture consisting of bisphenol A type epoxy resin and methylhexahydrophtalic anhydride, followed by thermally curing the resin so as to prepare an insulated coil for use in a high voltage rotary machine.

Examined was the workability of the built-up mica tape in the process of preparing the insulated coil. The built-up mica tape obtained in each of Examples 1 and 2 of the present invention was found to have a sufficient bending strength and to be satisfactory in workability. In addition, scattering of fine mica particles was not recognized.

The bending strength was measured in accordance with the method specified in JIS-K6911. Specifically, a laminated plate was prepared by using sheets cut from the built-up mica tape, followed by impregnating the laminated plate with the resins referred to previously. The bending strength of the resin-impregnated laminated sheet was found to be 60 kg/mm$^2$ for Example 1, 62 kg/mm$^2$ for Example 2, and 54 kg/mm$^2$ for the Comparative Example, which was markedly lower than those for Examples 1 and 2.

Figure 3:
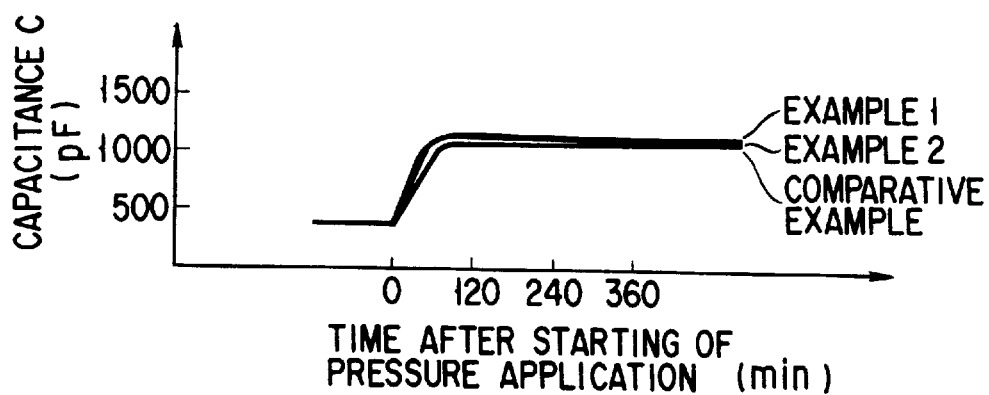
FIG. 3 is a graph showing changes with time in the capacitance of the insulated coil in each of Examples 1, 2 and a Comparative Example.

The resin impregnation capability was also examined on the basis of change with time in the capacitance, starting with initiation of the pressure application. The experimental data are shown in FIG. 3. As apparent from FIG. 3, Examples 1 and 2 were found to be superior to the Comparative Example in the resin impregnation capability.

Figure 4:
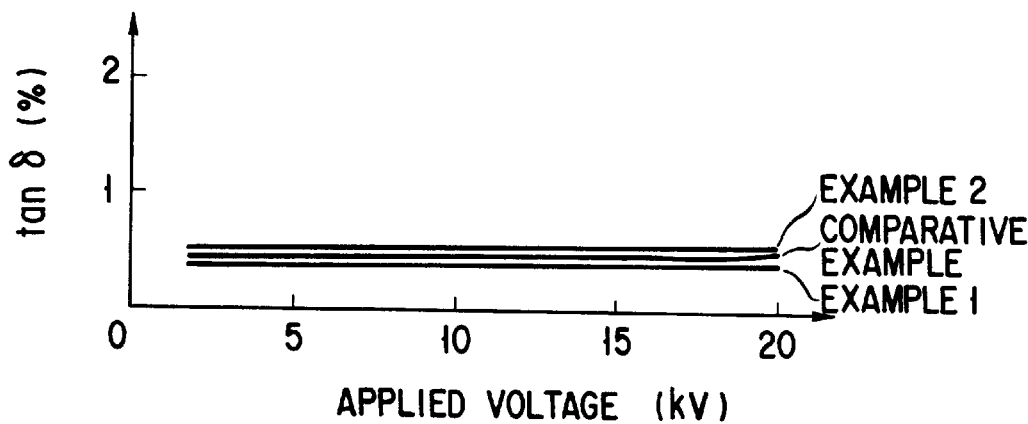
FIG. 4 is a graph showing changes with the applied voltage in the values of tan δ in each of Examples 1, 2 and a Comparative Example.
Figure 5:
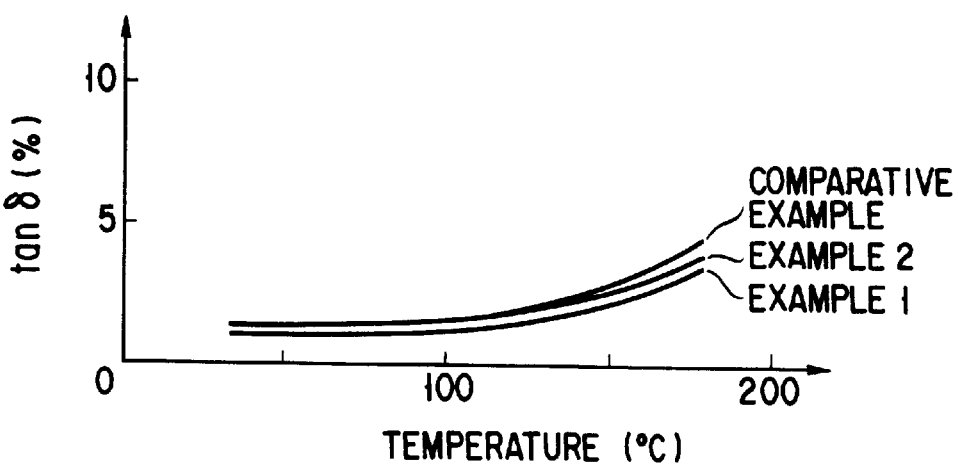
FIG. 5 is a graph showing changes with temperature in the values of tan δ in each of Examples 1, 2 and a Comparative Example.

Further, the relationships between tan δ and applied voltage and between tan δ and temperature were examined in respect of the insulating layer of the coil, the results being shown in FIGS. 4 and 5. As shown in FIG. 4, Examples 1 and 2 were found to be substantially equal to the Comparative Example in the tan δ-voltage characteristics. In an insulated coil, the impregnating resin is known to flow so as to cause void generation within the insulating layer, leading to an increased tan δ. As apparent from FIG. 5, the insulated coil in each of Examples 1 and 2 was found to be moderate in the rise of tan δ relative to temperature, compared with the Comparative Example. This clearly supports that flow of the impregnating resin and void generation within the insulating layer are suppressed, indicating that a satisfactory insulating layer was formed in each of the Examples of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A high voltage electric appliance comprising electric coils whose conductors are wrapped by an insulating tape with subsequent impregnation of thermosetting resin for electrical insulation, wherein said insulating tape is a laminated body consisting of built-up mica of fine mica particles and polyolefin synthetic pulp and a reinforcing material attached to the built-up mica for reinforcement thereof and wherein the bonding among the fine mica particles and between said built-up mica and the reinforcing material is effected by the polyolefin synthetic pulp as melted and solidified.

2. The high voltage electric appliance according to claim 1, wherein said polyolefin synthetic pulp consists of multi-branched fibers of polyethylene, polypropylene, polybutylene or a mixture thereof.

3. The high voltage electric appliance according to claim 1, wherein said built-up mica contains 100 parts by weight of fine mica particles and 2 to 12 parts by weight of polyolefin synthetic pulp.

4. A high voltage electric appliance comprising a coil prepared by winding an insulating tape about a conductor, followed by impregnation of a thermosetting resin for the insulating purpose, wherein said insulating tape is in the form of a laminated body consisting of a built-up mica containing fine mica particles and paraffin powder and a reinforcing material attached to said built-up mica, said paraffin powder being melted and, then, solidified to achieve bonding among said fine mica particles and between said built-up mica and said reinforcing material.

5. The high voltage electric appliance according to claim 4, wherein said built-up mica contains 100 parts by weight of mica fine particles and 5 to 30 parts by weight of paraffin powder.

6. The high voltage electric appliance according to claim 4, wherein said paraffin powder has a particle size of 50 to 70 meshes.

* * * * *